(12) United States Patent
Tobias et al.

(10) Patent No.: US 7,562,300 B1
(45) Date of Patent: Jul. 14, 2009

(54) SYSTEM FOR AUTOMATED COMPREHENSIVE REMOTE SERVICING FOR MEDIA INFORMATION

(75) Inventors: Martin Tobias, Seattle, WA (US); Beverly Kite, Seattle, WA (US); Mathews Brown, Seattle, WA (US)

(73) Assignee: Loudeye Technologies, Inc., Seattle, WA (US)

( * ) Notice: Subject to any disclaimer, the term of this patent is extended or adjusted under 35 U.S.C. 154(b) by 0 days.

(21) Appl. No.: 09/502,627

(22) Filed: Feb. 11, 2000

Related U.S. Application Data

(60) Provisional application No. 60/120,207, filed on Feb. 11, 1999, provisional application No. 60/120,206, filed on Feb. 11, 1999, provisional application No. 60/120,208, filed on Feb. 11, 1999, provisional application No. 60/120,209, filed on Feb. 11, 1999, provisional application No. 60/119,762, filed on Feb. 11, 1999, provisional application No. 60/156,817, filed on Sep. 29, 1999.

(51) Int. Cl.
*G06F 3/16* (2006.01)
(52) U.S. Cl. .................. 715/727; 715/737; 715/855; 715/731
(58) Field of Classification Search .............. 345/723, 345/719, 727, 853, 731; 725/23, 37, 112, 725/1; 705/51, 39, 40, 4, 23, 37; 348/441; 715/505, 507, 723, 719, 727, 853, 731, 855, 715/739, 737, 736; 709/231, 246, 247, 709
See application file for complete search history.

(56) References Cited

U.S. PATENT DOCUMENTS

| | | | |
|---|---|---|---|
| 5,421,620 A * | 6/1995 | Sauerwine .................. 229/301 |
| 5,852,435 A | 12/1998 | Vigneaux et al. |
| 5,867,494 A * | 2/1999 | Krishnaswamy et al. ..... 370/352 |
| 5,940,504 A | 8/1999 | Griswold |
| 6,057,872 A * | 5/2000 | Candelore .................... 725/104 |
| 6,138,120 A * | 10/2000 | Gongwer et al. .............. 707/10 |
| 6,269,343 B1 * | 7/2001 | Pallakoff ..................... 705/26 |
| 6,275,937 B1 * | 8/2001 | Hailpern et al. ............. 713/188 |
| 6,298,385 B1 * | 10/2001 | Sparks et al. ............... 709/233 |
| 6,374,260 B1 * | 4/2002 | Hoffert et al. ............... 345/716 |
| 6,385,596 B1 * | 5/2002 | Wiser et al. .................. 369/84 |
| 6,685,094 B2 * | 2/2004 | Cameron ..................... 235/468 |
| 2004/0260792 A1 * | 12/2004 | Speicher ..................... 709/219 |

OTHER PUBLICATIONS

WO 96 41285 A (INTERVU Inc) Dec. 19, 1996 p. 9, line 5-line 11, p. 22, line 9-line 13, p. 41, line 27-line 28, p. 43, paragraph 1-paragraph 2, p. 49, paragraph 4, p. 50, paragraph 5—p. 51, paragraph 1.

(Continued)

*Primary Examiner*—Simon Ke
(74) *Attorney, Agent, or Firm*—Alston & Bird, LLP

(57) ABSTRACT

Automated facilities are provided for uploading media program information through a network connection to an automated encoding system. An encoding request is received from a client which requests that the media program information be encoded in one or more encoding formats to produce publication-ready-media information. Automated facilities also provide ancillary services associated with the publication-ready-media information such as organization control, design control and publication control of the publication-ready-media information.

10 Claims, 6 Drawing Sheets

OTHER PUBLICATIONS

"Encoding.com Launches Rich Media Advertising Service to Enable Use of Audio and Video Advertising on the Net" 'ONLINE! Oct. 26, 1998, pp. 1-2, XP002141651 Retrieved from the Internet: <URL:encoding.com/company/news/releases/pr$_{13}$ 10__26__98.html> 'retrieved on Jul. 11, 2000! p. 1, paragraph 4—p. 2, line paragraph 1.

* cited by examiner

SYSTEM FOR AUTOMATED COMPREHENSIVE REMOTE SERVICING FOR MEDIA INFORMATION

This patent application claims priority from:

U.S. Provisional Patent Application No. 60/120,207, filed on Feb. 11, 1999, entitled SYSTEM FOR REMOTE PERFORMANCE OF DIGITAL ENCODING;

U.S. Provisional Patent Application No. 60/119,762, filed on Feb. 11, 1999, entitled PRODUCTION SYSTEM FOR DIGITALLY ENCODING INFORMATION;

U.S. Provisional Patent Application No. 60/120,209, filed on Feb. 11, 1999, entitled MEDIA DISTRIBUTION SYSTEM; U.S. Provisional Patent Application No. 60/120,206, filed on Feb. 11, 1999, entitled DIGITAL VCR;

U.S. Provisional Patent Application No. 60/120,208, filed on Feb. 11, 1999, entitled SYSTEM FOR HANDLING VOICE MAIL IN AN E-MAIL SYSTEM; and U.S. Provisional Patent Application No. 60/156,817, filed on Sep. 29, 1999, entitled STREAMING MEDIA ENCODING AGENT FOR TEMPORAL MODIFICATIONS;

the contents of which are hereby incorporated by reference in their entirety.

FIELD OF THE INVENTION

The present invention generally relates to computer systems, and more specifically to a mechanism for comprehensive remote servicing for media information.

BACKGROUND OF THE INVENTION

In recent years, the media industry has expanded its horizons beyond traditional analog technologies. Media programs such as audio, photographs, and even feature films are now being recorded or converted into a variety of different digital encoding formats. For example, digital movies may now be encoded using a variety of different encoding formats such as RealVideo, RealMedia, MPEG, QuickTime and Windows Media encoding formats. Likewise, digital audio recordings may be encoded using a variety of different encoding formats such as, RealAudio, Liquid Audio and Windows Media encoding formats. Media programs that have been encoded will hereafter be referred to as "encoded media files". Furthermore, some encoded formats allow for streaming the encoded media file through a client browser. Streaming is a technique for transferring data in a steady and continuous stream. Most end-users do not have fast access to download encoded files quickly. With streaming, an end-user's client browser can start playing the data before the entire encoded media file has been transmitted. Media programs that are encoded in streaming format will hereafter be referred to as "streaming media files". Thus, streaming media files are a subset of encoded media files.

In general, end-users do not possess, nor do they have access to, the requisite tools and encoding applications that are typically required to encode media programs into encoded media files. Moreover, even if an end-user is able to purchase a set of encoding tools or encoding applications, the cost of some encoding tools limits the number of different encoding format tools that the end-user may afford.

In addition, not only do end-users need to have access to the encoding applications that are of interest to them, the end-users are generally required to have specific knowledge as to the encoding parameter values that should be used to encode their media program for each encoding format. Often, the step of entering the specific encoding parameters for a particular encoding application can be an awkward and tedious task.

Moreover, the process of encoding end-users' media program can take a significant amount of time. Often, the time required to encode a media program may be significantly greater than the actual play time of the media program. For example, to encode a two-hour analog VHS tape in MPEG II format can often take four or more hours. Thus, because each encoding process requires such a significant amount of time and resources to complete, end-users will typically restrict themselves to encoding their media program in only a limited number of encoding formats.

Apart from converting the media program into an encoded media file (by encoding the media program into the desired encoding format), end-users are still faced with finding a convenient mechanism to share the encoded media file with the end-user's family, friends and business associates. Special equipment is needed to host encoded media files. For example, an end-user would be required to have specific knowledge about streaming media servers in order to use such a server for streaming encoded media that are in streaming format.

Based on the foregoing, it is clearly desirable to provide a mechanism that can automatically encode end-users' media program in multiple media formats and that automatically provides comprehensive services associated with the publication of the encoded media files.

SUMMARY OF THE INVENTION

The present invention comprises, in one aspect, a system and method for providing encoded media content over a network. The method involves allowing an end-user to submit media content for encoding into an encoding format specified by the end-user. A variety of methods may be used to submit media content, which include but are not limited to uploading media program files over a network or providing video or cassette tapes that may then be digitized and entered into the system.

Once the media program file is encoded, the encoded media file may be hosted at an encoded media server. The encoding and hosting of the media files is done automatically for the end-user. In one feature of the invention, the end-user may be provided with a file management mechanism over the network for managing the end-user's encoded media files such as moving, re-naming or changing the description of the encoded media files. In certain embodiments of the invention, the end-user may be provided with a mechanism for controlling the design of the encoded media files.

The invention also encompasses a computer-readable medium, and an apparatus configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
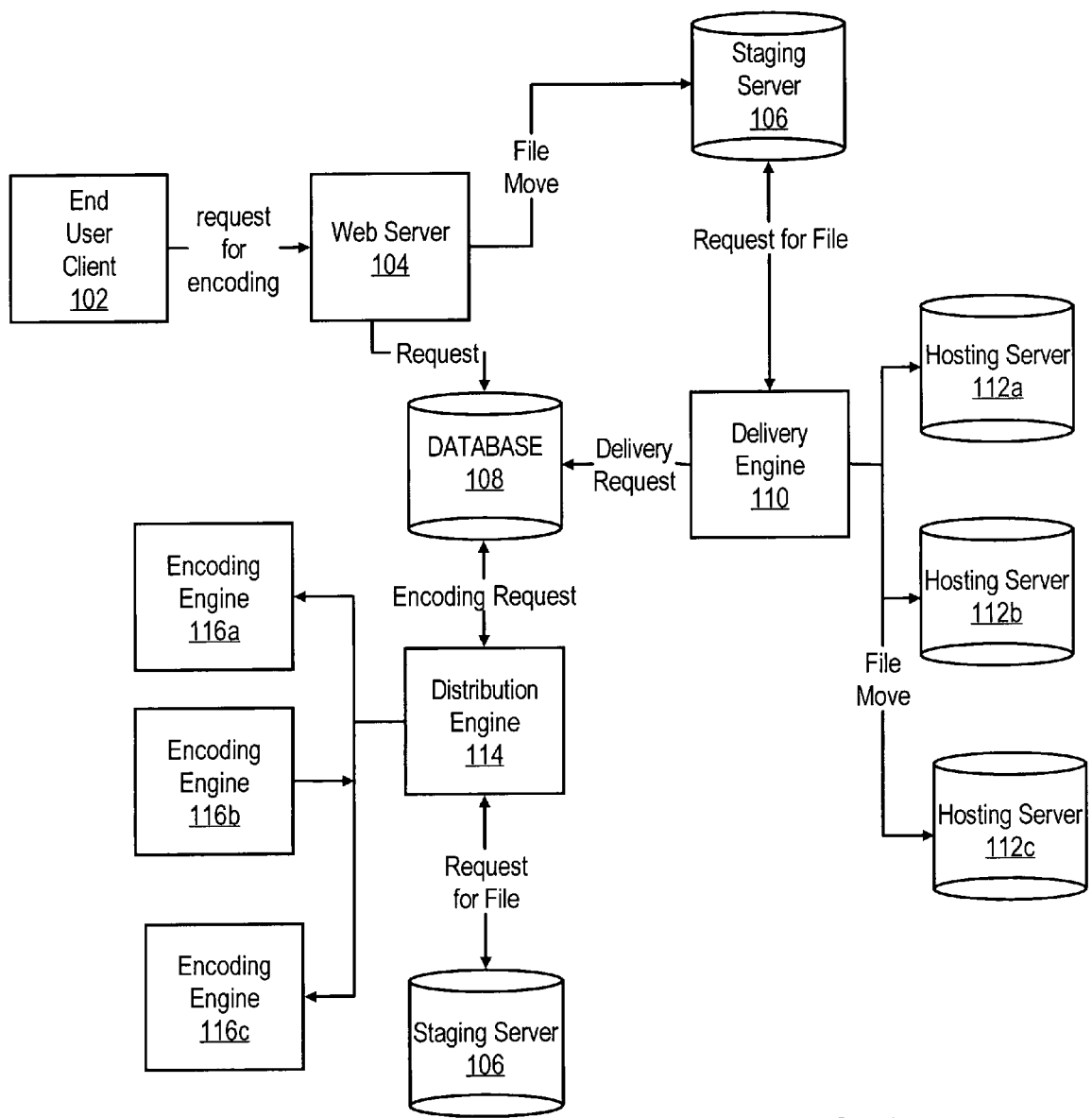
FIG. 1 is a block diagram of an automated comprehensive remote servicing system according to an embodiment of the invention.

A distributed encoding system for encoding media programs is disclosed. In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

Context Overview

A set of information that may be encoded in a particular encoding format is generally referred to herein as a "media program". For example, the information contained on such storage mediums as VHS or 8-MM tapes, DVDs or Laser Discs, BetaCams or Digital Video Cassettes, Compact Discs (CDs), and audio cassettes or 8-Track tapes are all examples of media programs that can be encoded. Further, media programs may be received from sources other than pre-recorded storage. For example, a media program may arrive as a live feed from an analog or digital camera, or from a satellite or cable feed.

As described herein, a media program may consist of an entire work, such as the entire movie stored on a VHS tape; or may instead consist of only a portion of a work, such as a single song stored on a CD that contains a plurality of recorded songs.

According to one embodiment of the invention, end-users that wish to encode their media programs may access a Web page through the Internet, upload their media programs and specify one or more encoding formats to which to convert their media programs.

In response to uploading a media program, for each encoding format, the encoding system automatically encodes the media program into the desired encoding format to produce an encoded media file. In certain embodiments, the encoding system stores the encoded media file in a storage device that is accessible to the end-user through a browser application. For example, the end-user may be provided a URL that links the end-user to the encoded media files that are stored in the storage device.

Thereafter, the end-user is informed of the completion of the encoding process via e-mail or other similar mechanisms. In one embodiment, the end-user receives the encoded media file in the form of a zip file via e-mail.

In one embodiment, when the end-user receives notification that the encoding is complete, the end-user may then log onto a particular server on the Internet to preview, delete, or download the encoded media file. The end-user may also request hosting services for the end-user's encoded media files. If the end-user desires hosting for the encoded media files, the encoded media files are moved to one or more hosting servers. In certain embodiments, the hosting server is a publishing host that provides to the end-user URL links by which an end-user may access the encoded media files.

In certain embodiments, the encoding system may provide support services for hosting the end-user's encoded media files at a foreign publishing host, i.e., a publishing host that is not maintained by the same service provider that provided the encoding services. For example, assume that Customer A owns an e-commerce enterprise and has an e-commerce Web site. Further assume that Customer A wishes to offer free remote servicing of media programs to all visitors to Customer A's Web site. Assume that Customer A lacks the expertise to offer free remote servicing of media programs. Thus one solution for Customer A would be for Customer A to purchase services for remote servicing of media programs from Third Party B that sells digital media services. Further assume that Third Party B uses an embodiment of the invention to provide digital media services. An example of a third party that sells digital media services is Loudeye Technologies, Inc. Further information on Loudeye Technologies, Inc may be obtained from http://www.loudeye.com/. When Customer A purchases from Third Party B services for remote servicing of media programs for the visitors to their Web site, Customer A may choose to purchase a comprehensive set of services, which include hosting of the visitor's encoded media programs. Alternatively, Customer A may choose to purchase from the third party only a subset of services such as encoding and file management services for visitors of Customer A's Web site. In such a case, Customer A may have the option of designating a foreign publishing host. The foreign publishing host is a hosting server that is not maintained by Third Party B. Note that the visitors to Customer A's Web site are the "end-users" of the embodiment of the invention and to whom we have referred heretofore in the description of the embodiments of the invention. Customers such as Customer A will hereafter be referred to as "customers".

In certain embodiments, when customers choose to allow end-users' encoded media files to be hosted at Third Party B's hosting server, the end-users are provided with mechanisms for managing their encoded media files. For example, assume that an end-user's encoded media file is a streaming media file. The end-user may be provided the ability to change the design of their streaming media file. To illustrate, the end-user may be provided with the ability to clip and move-around a sequence of images in a video file using an online editing tool. Further, the customer and or the end-user may request real time reporting on the frequency with which the end-user's streaming media file has been streamed out to the other internet users. For example, the real time reporting may report on the number of "hits" received by a particular streaming media file. A large number of hits is usually indicative of the level of popularity that a particular streaming media file enjoys. The mechanism for managing encoded media files will be explained in greater detail below.

Computer System Architecture

FIG. 1 is a block diagram of an automated comprehensive remote servicing system 100 in which certain embodiments of the invention may be used. Generally, comprehensive remote servicing system 100 includes a plurality of end-user clients. However, for simplicity only one end-user client 102 is shown. Comprehensive remote servicing system 100 also includes a Web server 104, staging server 106, database 108, delivery engine 110, hosting servers 112a-c, distribution engine 114, and encoding engines 116a-c. The components of system 100 are connected through one or more network systems. These one or more network systems may include, but are not limited to, Local Area Networks (LAN), and Wide Area Networks (WAN), including the Internet. Thus, the comprehensive remote servicing system allows each component to be separately located.

In FIG. 1, end-user client 102 represents a device, such as a personal computer, workstation, or other device that is capable of communicating with web server 104. In one embodiment, end-user client 102 includes a browser application, such as Microsoft Internet Explorer® or Netscape Navigator®, that can request, receive and display electronic documents over a network connection. Thus, an end-user may use the end-user client to make encoding requests.

In one embodiment, Web server 104 is a computer, or one or more hardware or software components or processes that cooperate or execute in one or more computer systems. For example, Web server 104 may be configured as a Java Servlet running on an Apache web server on Linux.

In one embodiment, Web server 104 is configured to respond to message requests that are received from end-user clients 102. Web server 104 communicates interface data to end-user client 102 for displaying a user interface at end-user client 102. The interface data may consist of electronic document information, such as HyperText Markup Language (HTML) or Extensible Markup Language (XML) page information that is communicated between Web server 104 and end-user client 102. In one embodiment, the user interface data consists of interface templates that provide a user-friendly mechanism for entering end-user requests ("encoding requests"). Each encoding request generally includes a set of end-user order information, and a set of encoding parameters for a particular uploaded media file. Thus, by interacting with the user interface provided by Web server 104, an end-user can readily create encoding requests for the encoding uploaded media programs. The end-user may also use the user interface provided by Web server 104 to perform other operations with respect to either their media programs or encoded media files. For example the end-user may use the user interface to access and manipulate their encoded media file. For example, the user interface may be an HTML web page that contains an uploading option. When the end-user chooses the uploading option, the user interface allows the end-user to select a media program from the end-user's computer storage unit. Once the end-user selects a media program for uploading, Web server 104 automatically causes the end-user's selected media program to be uploaded.

Web server 104 communicates with database 108. In certain embodiments, when an end-user uploads a media program and makes encoding requests associated with the uploaded media program, information on the encoding request and on the location of the uploaded media program is logged on database 108. End-users may also request to download their encoded media files, or manage their encoded media files through a user interface provided by Web server 104.

Database 108 communicates with distribution engine 114, which sends the uploaded media program to one or more encoding engines such as encoding engines 116a-c. In one embodiment, each encoding engine is dedicated to a different type of encoding format. For example, if the encoding request specified several encoding formats, a copy of uploaded media program is sent to the appropriate encoding engine configured to encode media programs into the specified encoding format. Thus encoding engines 116a-c perform the task of encoding the media program.

Distribution engine 114 also communicates with staging server 106 where the encoded media files are stored. Delivery engine 110 is in communication with staging server 106, database 108, and hosting servers 112a-c. When database 108 sends a delivery request associated with a particular encoded media file to delivery engine 110, delivery engine 110 then requests the particular encoded media file from staging server 106 and moves the encoded media file to an appropriate hosting server such as any one of hosting servers 112a-c. In certain embodiments, copies of the encoded media file may be made and sent to multiple hosting servers.

In one embodiment, each hosting server is dedicated to a different type of encoding format. Hosting servers 112a-b send the encoded media files to end-user client upon end-user clients request for delivery of the encoded media files.

Figure 2:
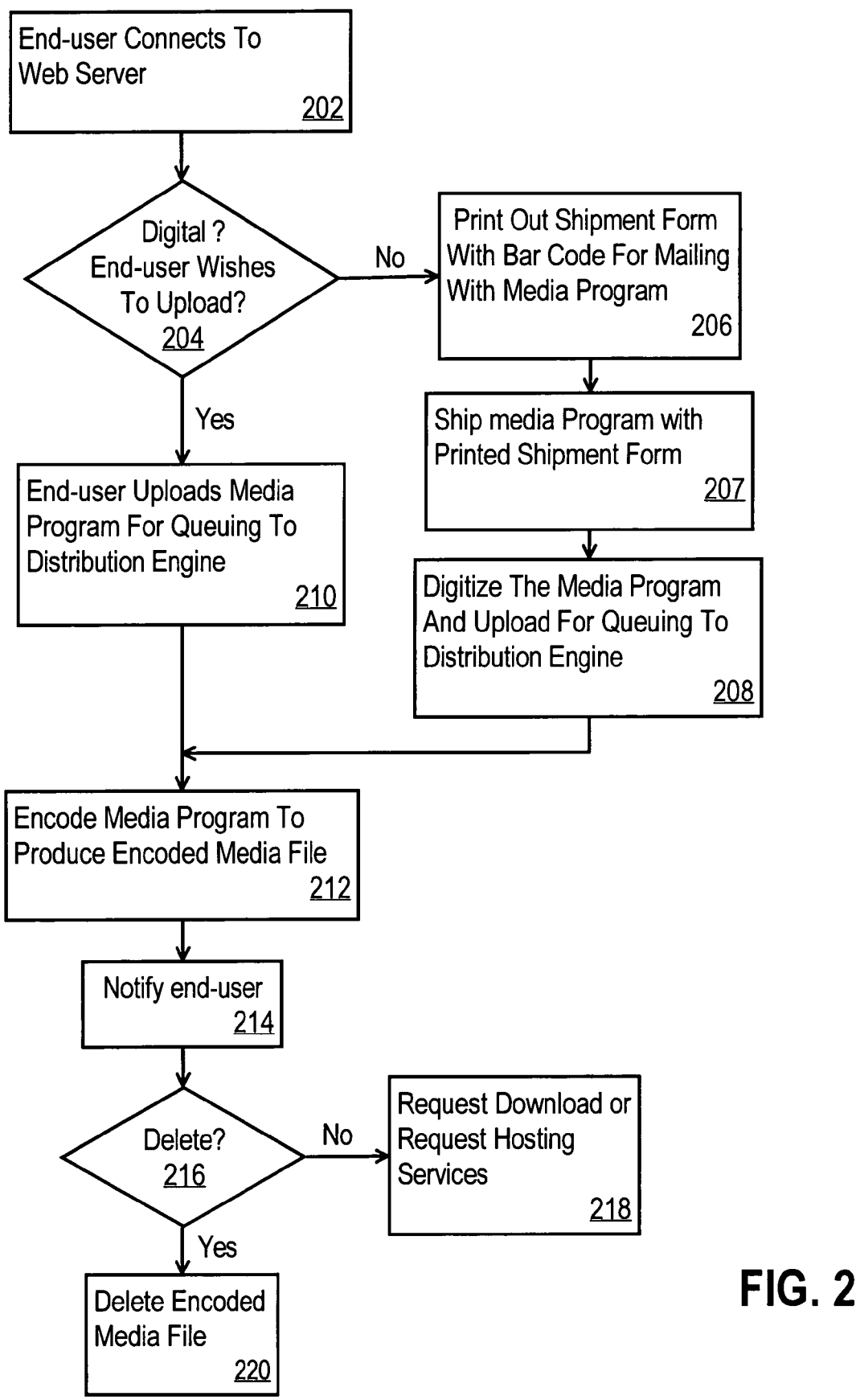
FIG. 2 is a flow diagram that illustrates an encoding procedure according to an embodiment of the invention.

Staging server 106, database 108, delivery engine 110, hosting servers 112a-c, distribution engine 114, encoding engines 116a-c are computers, or one or more hardware or software components or processes that cooperate or execute in one or more computer systems Encoding Procedure FIG. 2 is a flow diagram that illustrates an example of an encoding procedure. For the purposes of explanation, the steps in FIG. 2 will be described with reference to the components of FIG. 1 according to one embodiment of the invention. As illustrated at block 202 of FIG. 2, an end-user makes an online connection over the Internet to a host operating system server. According to one embodiment of the invention, the end-user interacts with the Web server 104 through an internet-enabled interface displayed at end-user client 102. At block 204, the mechanism determines if the media program is digital. If the media program is not digital, then the end-user may interact with the interface displayed at end-user client 102 to print out a shipment form that has a bar code for mailing, and which is available through the Web interface as shown at block 206. At block 207, the end-user may use the shipment form to physically ship his media program to a designated physical location where services are provided to digitize the media program for queuing to the distribution engine 114 of FIG. 1. The bar code on the shipment form is used to match the end-user's shipment with the end-user's online request for encoding.

If at block 204 the mechanism determines that the media program is digital, then at block 210, the mechanism allows the end-user to upload the media program for queuing to the distribution engine 116 of FIG. 1.

At block 208, when a physically-shipped media program is received, the mechanism provides a service to digitize the end-user's media program, if necessary, and uploads the digitized media program for queuing to the distribution engine 116 of FIG. 1.

At block 212, automated facilities are provided to encode the media program to produce encoded media files. Various mechanisms have been developed for encoding media content. One such mechanism is presented in co-pending application, entitled "DISTRIBUTED PRODUCTION SYSTEM FOR DIGITALLY ENCODING INFORMATION", Ser. No. 09/499,961, filed concurrently herewith, and naming as inventors Martin Tobias, Beverley Kite, Mathews Brown, Eric Lindvall, Jeffrey Oberlander, Aaron Roberts, Anna Hansen, Greg Malley and Ken Suzuki, the contents of which are hereby included in their entirety by reference.

When the encoding process is complete, the mechanism notifies the end-user as shown at block 214. At block 216, the end-user decides whether to delete or retain the encoded media file after the end-user pre-views the encoded media file. If the end-user decides not to delete the encoded media file, then at block 218, the end-user may request to download the encoded media file or request hosting services for the encoded media file. If the end-user decides to delete the encoded media file, then at block 220, the user deletes the encoded media file

End-User Options

Figure 3A:
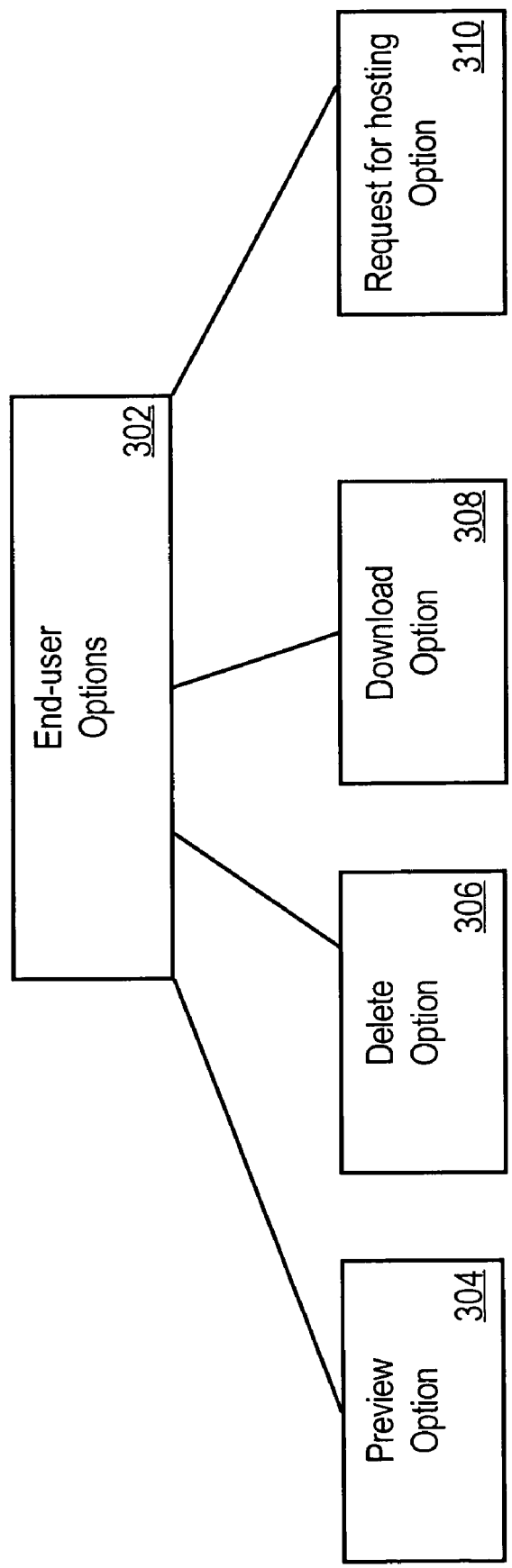
FIG. 3A is a block diagram that illustrates an example of different comprehensive remote servicing options offered to an end-user according to an embodiment of the invention.

After the mechanism notifies the end-user that the encoding process is complete, as shown at block 214 of FIG. 2, the end-user is provided with several options. FIG. 3A is a block diagram that illustrates the different comprehensive remote servicing options available to the end-user. In one embodiment, end-user options 302 comprises a preview option 304, delete option 306, download option 308, request for hosting option 310 or request for support of foreign hosting option 312.

The preview option 304 allows the end-user to preview the content of the end-user's encoded media file at no cost to the end-user. Based on the preview, the end-user may decide to discard the encoded media file. Thus, option 306 allows the end-user to delete the encoded media file. On the other hand, if the end-user is satisfied with the preview, he may decide to purchase a copy of the encoded media file. Option 308 allows the end-user to download the encoded media file. For example, referring to FIG. 1, Web server 104 may display at client 104*a* a user interface that offers the end-user the various options as depicted in FIG. 3A. When the end-user selects the download option, web server 104 communicates with staging server 106 of FIG. 1 to allow end user to download the encoded media file.

Hosting

After the encoding process, the end-user may request hosting for their encoded media files. In one embodiment, the end-user requests hosting by selecting the request for hosting option 310 of FIG. 3A. In FIG. 1, when the end-user requests hosting for the encoded media files, the encoded media files are transferred from staging server 106 to one or more hosting servers host 112*a-c*. To illustrate, assume that an encoded media file is sent to hosting server 112*a*, comprehensive remote servicing system 100 creates for the end-user a URL link that links end-user client to the encoded media file that is hosted by hosting server 112*a*.

In one embodiment, each hosting server is dedicated to a different type of encoding format. For example assume that hosting server 112*a* is dedicated to encoded streaming format and streams streaming media files of a specific streaming format to end-user client 102. Examples of different encoding streaming formats are RealAudio, RealVideo, and Windows Media.

To further illustrate, assume that an end-user mails in a videotape and requests that the videotape be encoded into RealVideo format. Further assume that the end-user requests hosting services for the end-user's encoded media file encoded in the RealVideo format. When the end-user requests hosting of the encoded media file, the end-user receives a URL link that the end-user may display on the end-user's personal home page. The URL is a link to encoded RealVideo file at a hosting server where the encoded RealVideo file is hosted.

Customer Options

Figure 3B:
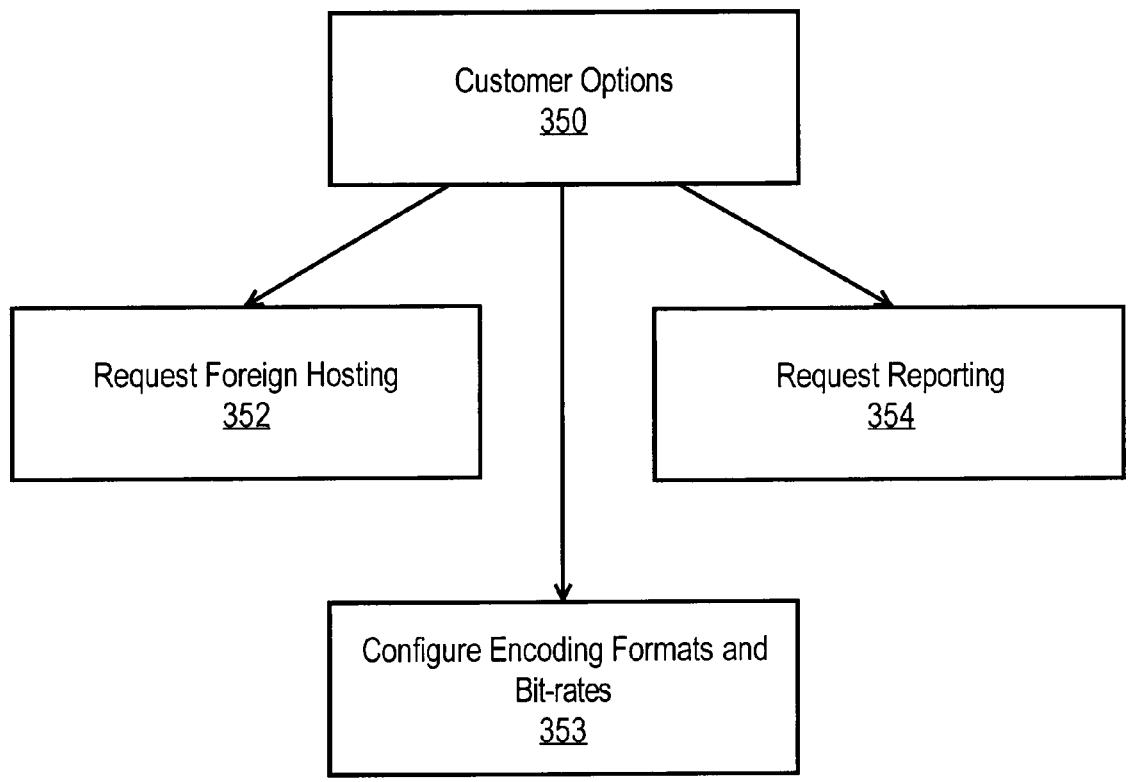
FIG. 3B is a block diagram that illustrates an example of different comprehensive remote servicing options offered to a customer according to an embodiment of the invention.

As explained earlier, customers may choose to purchase a comprehensive set of services, which include hosting of the end user's encoded media programs. FIG. 3B displays the customer options. Block 352 indicates that the customer may request hosting on a foreign hosting server of the customer's choice. For example, when a customer chooses hosting at a foreign hosting server, comprehensive remote servicing system 100 would provide support for such a request. Assume that the customer requests that the end-user's encoded media files be hosted by a foreign hosting server that is not managed by system 100. Upon the customer's request, Web server 104 may transfer the encoded media files to foreign host server, and provide a URL link to the encoded media files at the foreign hosting server. As in the above example for streaming media files, when an end-user clicks on the URL, foreign hosting server streams the encoded RealVideo to the end-user client using a RealVideo streaming server.

At block 353, customers may also configure what encoding formats and bit-rates are accepted for encoding, and what digital formats are accepted (for example, AVI and WAV). Customers may configure the system to process whichever formats/bit-rates and digital formats that they want.

At block 354, the customer has the option of making online requests for reports on any encoded media files of any end-user. For example, a customer may make an online request for reporting on an encoded media file that belongs to an end-user who is using the free digital media services provided by the customer.

Management and Control

Figure 4:
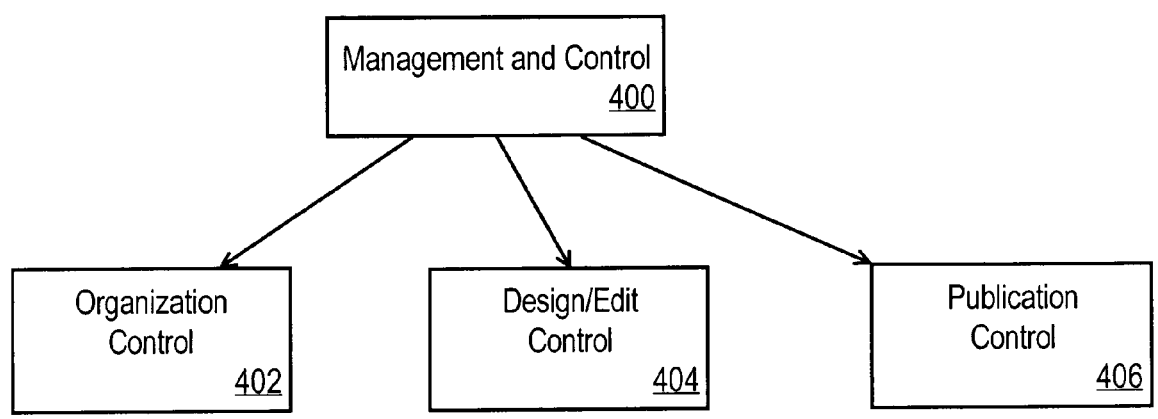
FIG. 4 is a block diagram that illustrates the components of a management and control system according to an embodiment of the invention.

According to one embodiment, the comprehensive remote servicing system provides end-users with management and control of their encoded media files. FIG. 4 is a block diagram that illustrates the components of the management and control system 400, which comprises organization control 402, design control 404 and publication control 406.

Organization Control

One embodiment of the invention provides the end-user an online mechanism for organizing encoded media files and folders in a directory tree structure in the end-user's private account. For example, referring to FIG. 1, Web server 104 may provide a user interface that is displayed at end-user client 102. By interacting with the user interface provided by Web server 104, the end-user may perform file management tasks such as creating new folders for the end-user's encoded media files. The end-user may also delete folders that he no longer needs or re-name or move files from one folder to another. For example, in certain embodiments, a file management tool with features similar to Windows Explorer® is provided for managing and organizing the end-user's encoded media files. The user interface provided by Web server 104 links provides the end-user with links to the encoded media files that are stored at the one or more hosting servers 112*a-c*.

Design Control

According to another feature, end-users are given online flexibility to control and edit the design of their encoded media files. For example, a mechanism is provided to end-users to re-arrange online the sequence of segments of encoded media files. For example, assume that a SMIL file consists of segments of encoded media in the order of BABY PICTURE #1, BABY PICTURE #2, BABY PICTURE #3, and BABY PICTURE #4. The end-user may decide to re-arrange the segments in the following order: BABY PICTURE #4, BABY PICTURE #2, BABY PICTURE #1, and BABY PICTURE #3.

Similarly, the end-user has the flexibility to set the timing between segments. For example, the end-user may want to fade in and fade out between images in a SMIL file. The end-user also has the flexibility to synchronize text and or captions with each segment, and choose or add music for each segment. In addition, the end-user has the flexibility to perform online editing of the images of each segment. For example the end-user may augment the images in a segment of the media file by selecting commercially available encoded stock images that may be spliced into a segment of media file. The end-user may also cut out images that are undesirable from a segment of the media file.

Publication Control

According to another feature of the invention, the customer and users may be provided a mechanism for online requesting of reports on their streaming media file. The reports are provided in real time to the customer. For example, a customer may make an online request for an online report that indicates the number of streaming media files hosted by end-users on their servers and the number of hits per streaming media file. Alternatively, an end-user may make an online request for an online report that indicates the most the number of hits for each of their streaming media files to determine which streaming media file is most popular. If the report reveals that a particular streaming media file is unpopular then the end-user may decide to remove the unpopular streaming media file from the hosting server.

Purchasing

According to a feature of the invention, an end-user is provided with a convenient purchasing credit system. To illustrate, the end-user may wish to purchase streaming media files or purchase hosting services for their streaming media files. Under the credit system, each purchase transaction is associated with a certain number of credits. The end-user uses credits to pay for a product or service.

The end-user may purchase credits in advance. The price per credit is inversely proportional to the number of credits purchased. Under the purchasing credit system, each e-commerce transaction associated with the encoded media files costs a predetermined number of credits. The advantage of such a purchasing credit system is that discounts that are offered to customers are directly based on the number of credits purchased by the customer rather than on other variables such as size, format or complexity of the media program or that of the encoded media file.

Hardware Overview

Figure 5:
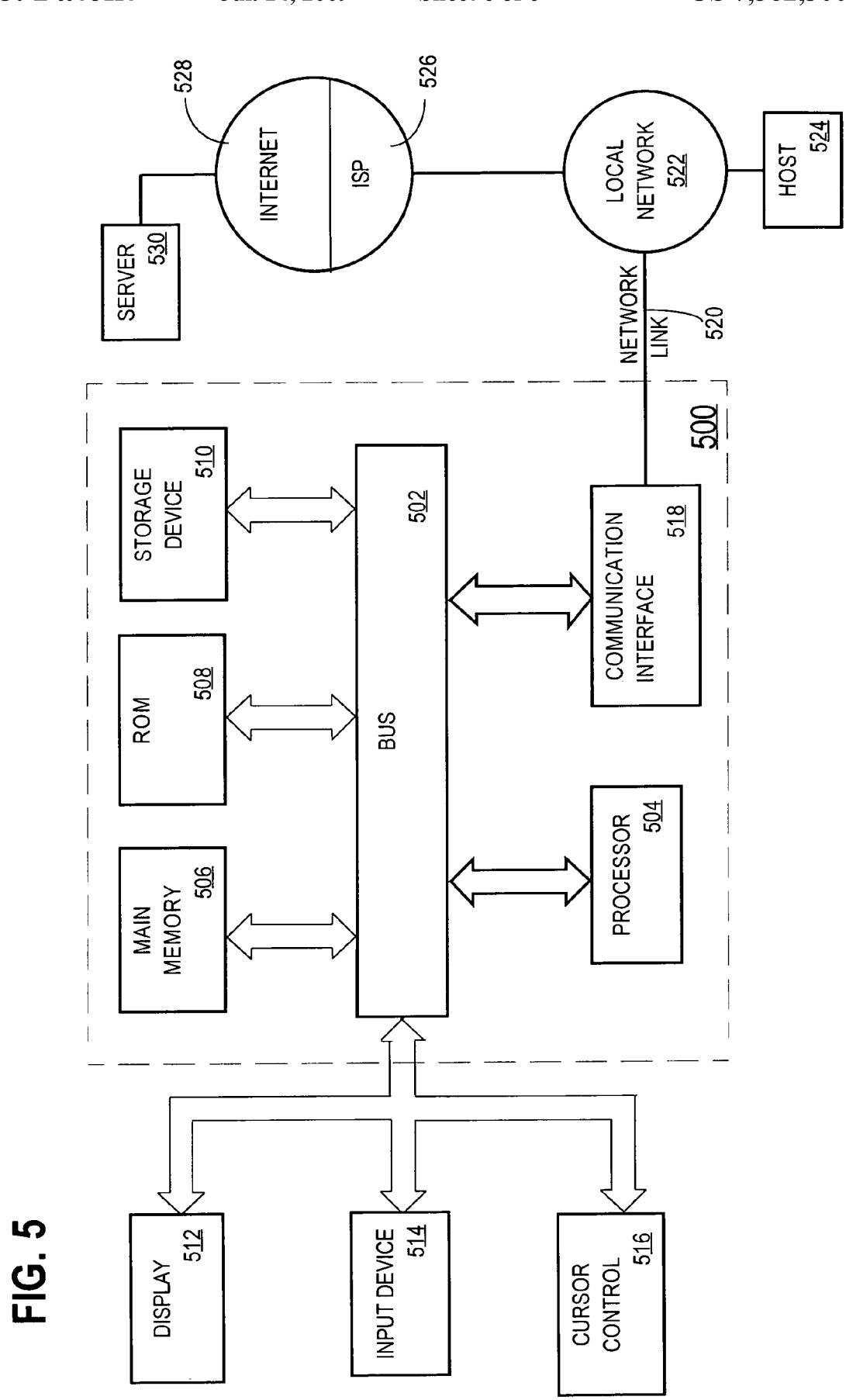
FIG. 5 is a block diagram of a computer system hardware arrangement upon which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for comprehensive remote servicing of media programs. According to one embodiment of the invention, comprehensive remote servicing of media programs is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions.

The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for distributed encoding of media programs as described herein.

The received code may be executed by processor 504 as it is received, and/or stored in storage device 510, or other non-volatile storage for later execution. In this manner, computer system 500 may obtain application code in the form of a carrier wave.

In describing certain embodiments of the invention, several drawing figures have been used for explanation purposes. However, the invention is not limited to any particular context as shown in drawing figures. Thus, the specification and drawings are, accordingly, to be regarded in an illustrative rather than a restrictive sense.

In addition, in this disclosure, including in the claims, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Thus, embodiments of the invention are only limited by the following claims.

What is claimed is:

1. A method comprising:
   receiving over a network a first request to encode one or more media program files;
   for each media program file to be encoded, receiving a selection of one or more encoding formats for encoding the media program file, wherein the selection is selected from at least a first encoding format with a first coder/decoder ("CODEC") and a second encoding format with a second CODEC that differs from the first CODEC, wherein the first encoding format and the second encoding format can be applied to the media program file, and wherein the first request and the selection are received from a client that is connected to the network;
   in response to receiving the first request, servicing the first request by automatically generating one or more encoded media files by encoding the media program in the one or more selected encoding formats; and
   after encoding the media program in the one or more selected encoding formats, querying the client as to whether the encoded media program is to be deleted, hosted, or transmitted;
   if the client, in a second request, requests hosting of the one or more encoded media files, automatically hosting the one or more encoded media files on a hosting server, wherein the hosting server is configured to allow selective access by visitors to the one or more encoded media files over the network, as determined by the client, wherein the hosting server is selected, based on the selected encoding format, from a group of dedicated hosting servers each hosting a different type of encoding format, and wherein the client is enabled to choose a hosting server that is maintained by an entity different from that which encodes the media program,
   and if the client does not request hosting of the one or more encoded media files, enabling the client to access the one or more encoded media files without hosting the files for access on a hosting server,
   wherein
   credits are purchased by an end-user;
   a predetermined number of credits are associated with each e-commerce transaction associated with remote servicing of the media program; and
   pricing of said credits purchased by said end-user are inversely proportionate to a number of credits purchased, wherein the method further comprises:
   causing a user interface to be displayed at the client, wherein the user interface allows entry of encoding requests and allows uploading of the media program from the client to a server over the network;
   in response to a client interacting with the user interface, providing to the client an encoding request form through the user interface, wherein the encoding request form includes a mailing bar code, and wherein the bar code is used to match shipped media program files to the first request to encode; and
   providing automated online design control, wherein the design control comprises the control of one or more of:
   sequencing of segments of the one or more encoded media files;
   timing between the segments of the one or more encoded media files;
   synchronization of text with the segments of the one or more encoded media files;
   selection of music for each segment of the one or more encoded media files; and
   alteration of the segments of the one or more encoded media files.

2. The method as recited in claim 1, further comprising allowing the client to create a tree structure directory through commands for organizing encoded media files that are hosted at the service host.

3. The method as recited in claim 1, further comprising:
providing real-time reporting of statistics on the one or more encoded media files that are hosted at the hosting server; and
allowing the client to enter commands to dynamically determine whether to remove the one or more encoded media files from publication.

4. The method as recited in claim 1, wherein the selective access includes access given to a visitor of the network and which allows the visitor to receive a publication of at least one of the one or more encoded media files in response to a request by the visitor to receive the publication.

5. The method as recited in claim 1, wherein the segments of the one or more encoded media files comprise two or more slides, frames, or video clips.

6. A computer program product comprising at least one computer-readable storage medium having computer-readable program code portions stored therein, the computer-readable program code portions comprising:
a first executable portion for receiving over a network a first request to encode one or more media program files;
a second executable portion for receiving, for each media program file to be encoded, a selection of one or more encoding formats for encoding the media program file, the selection is selected from at least a first encoding format with a first coder/decoder ("CODEC") and a second encoding format with a second CODEC that differs from the first CODEC, wherein the first encoding format and the second encoding format can be applied to the media program file, and wherein the first request is received from a client that is connected to the network;
a third executable portion for servicing the first request by automatically generating one or more encoded media files by encoding the media program in the one or more selected encoding formats, in response to receiving the first request;
a fourth executable portion for querying the client as to whether the encoded media program is to be deleted, hosted, or transmitted;
a fifth executable portion for determining if the client, in a second request, requests hosting of the one or more encoded media files, and if so, automatically hosting the one or more encoded media files on a hosting server, wherein the hosting server is configured to allow selective access by visitors to the one or more encoded media files over the network, as determined by the client;
a sixth executable portion for selecting the hosting server based on the selected encoding format, from a group of dedicated hosting servers each hosting a different type of encoding format, and wherein the client is enabled to choose a hosting server that is maintained by an entity different from that which encodes the media program;
a seventh executable portion for enabling the client to access the one or more encoded media files without hosting the files for access on a hosting server, if the client does not request hosting of the one or more encoded media files;
an eighth executable portion for enabling an end-user to purchase credits, wherein a predetermined number of credits are associated with each e-commerce transaction associated with remote servicing of the media program;
a ninth executable portion for determining that pricing of said credits purchased by said end-user are inversely proportionate to a number of credits purchased;
a tenth executable portion for causing a user interface to be displayed at the client, wherein the user interface allows entry of encoding requests and allows uploading of the media program from the client to a server over the network;
an eleventh executable portion for providing in response to a client interacting with the user interface, to the client an encoding request form through the user interface, wherein the encoding request form includes a mailing bar code, and wherein the bar code is used to match shipped media program files to the first request to encode; and
a twelfth executable portion for providing automated online design control, wherein the design control comprises the control of one or more of:
sequencing of segments of the one or more encoded media files;
timing between the segments of the one or more encoded media files;
synchronization of text with the segments of the one or more encoded media files;
selection of music for each segment of the one or more encoded media files; and
alteration of the segments of the one or more encoded media files.

7. The computer program product as recited in claim 6, further comprising a tenth executable portion for allowing a client to create a tree structure directory through commands entered at the client for organizing encoded media files that are hosted at the service host.

8. The computer program product as recited in claim 6, further comprising:
a tenth executable portion for providing real-time reporting of statistics on the one or more encoded media files that are hosted at the hosting server; and
an eleventh executable portion for allowing a client through entering commands to dynamically determine whether to remove the one or more encoded media files from publication.

9. The computer program product as recited in claim 6, wherein the selective access includes access given to a visitor of the network and which allows the visitor to receive a publication of at least one of the one or more encoded media files in response to a request by the visitor to receive the publication.

10. The computer program product as recited in claim 6, wherein the segments of the one or more encoded media files comprise two or more slides, frames, or video clips.

\* \* \* \* \*